United States Patent
Hideyuki

[11] Patent Number: 5,473,394
[45] Date of Patent: Dec. 5, 1995

[54] CONVERGENCE MEASURING APPARATUS

[75] Inventor: Shiraki Hideyuki, Nagaokakyo, Japan

[73] Assignee: Murata Mfg. Co., Ltd., Kyoto, Japan

[21] Appl. No.: 291,324

[22] Filed: Aug. 16, 1994

Related U.S. Application Data

[63] Continuation of Ser. No. 936,808, Aug. 27, 1992, abandoned.

[30] Foreign Application Priority Data

Sep. 13, 1991 [JP] Japan ................................ 3-262739

[51] Int. Cl.$^6$ .................................................... H04N 9/78
[52] U.S. Cl. ........................ 348/807; 348/190; 315/368.12
[58] Field of Search ........................... 358/10, 135, 232; 315/368, 368.11, 368.12, 368.18; 348/190, 191, 177, 184, 189, 178, 179, 807; 315/368.11, 368.12, 368.18; H04N 9/78, 17/00

[56] References Cited

U.S. PATENT DOCUMENTS

| | | | |
|---|---|---|---|
| 4,316,211 | 2/1982 | Mackey et al. | 358/10 |
| 4,364,079 | 12/1982 | Pons | 358/10 |
| 4,441,120 | 4/1984 | Gerritsen | 358/10 |
| 4,602,272 | 7/1986 | Duschl | 348/191 |
| 4,686,429 | 8/1987 | Fendley | 348/807 |
| 4,688,079 | 8/1987 | Fendley | 348/190 |
| 4,814,669 | 3/1989 | Herrmann et al. | 358/10 X |
| 4,814,858 | 3/1989 | Mochizuki et al. | 348/191 |
| 4,857,998 | 8/1989 | Tsujihara et al. | 358/10 X |
| 4,925,420 | 5/1990 | Fourche et al. | 348/807 |
| 5,032,769 | 2/1991 | Kawakami | 348/807 |
| 5,049,791 | 9/1991 | Kawakami | 358/10 X |
| 5,111,110 | 5/1992 | Houben | 358/10 X |
| 5,159,436 | 10/1992 | Soneira | 348/807 |

Primary Examiner—Victor R. Kostak
Attorney, Agent, or Firm—Townsend and Townsend and Crew

[57] ABSTRACT

A convergence measurement apparatus for a color cathode-ray tube is capable of high precision convergence measurement by elimination of luminance omission portions occurring in the screen. A dot pattern displayed on a color cathode-ray tube is picked up by an image pickup camera and is stored in an image memory. A signal movement amount control unit is arranged to move a beam spot of the dot pattern displayed on the cathode-ray tube by a predetermined pitch in a horizontal or vertical direction. Corresponding dot pattern shifting occurs to sequentially record images of discrete colors for a more accurate measure of convergence. For example, if a gap between adjacent phosphor elements of one color (for example red) is defined as one pitch, three sequential red dot patterns can be each shifted by ⅓ of a pitch and thereafter picked up and stored in the image memory of dot pattern data. An image synthesizing means retains the dot pattern data sequentially gathered by the corresponding movement amounts and synthesizes them to obtain a composite red image. The process is repeated for green and blue dot patterns data. A convergence amount is obtained from a shift amount of the center of gravity of the luminance distribution of the synthesized pattern data of each color component and is displayed on a display unit.

6 Claims, 3 Drawing Sheets

LUMINANT PHOSPHOR PORTION

NON-LUMINANT PHOSPHOR PORTION 0.0  A,B 0.0  A,B

A  B
−0.075

B  A
+0.075

ONE PITCH

FIG. 3a ——— INITIAL FETCHED DATA

FIG. 3b ——— ONE-PITCH SHIFT DATA

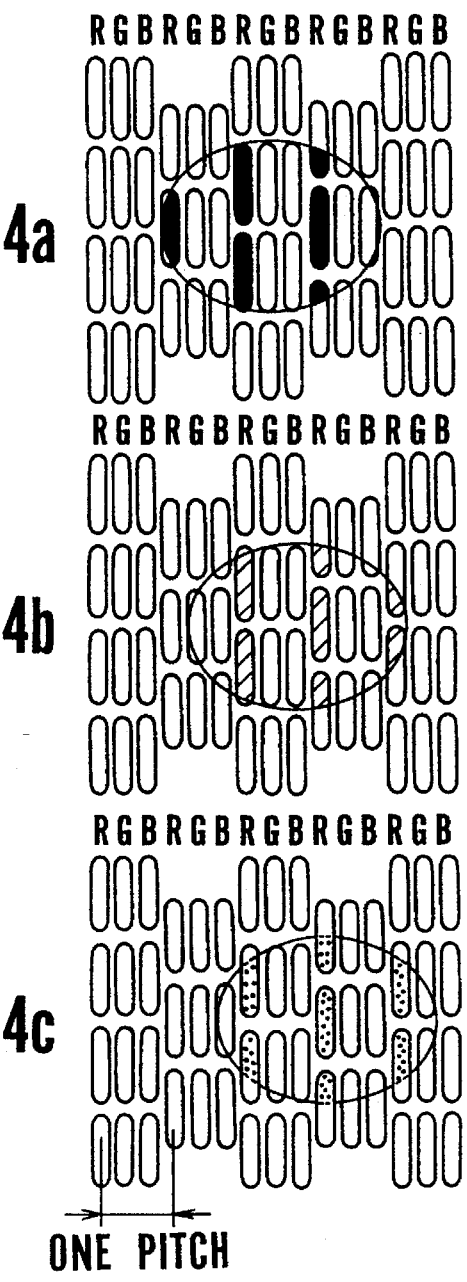
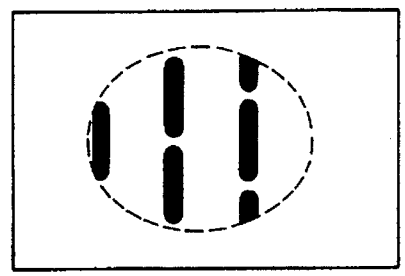
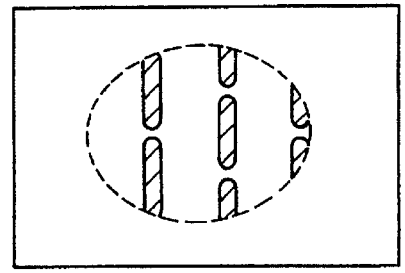
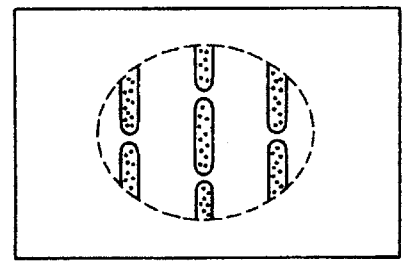
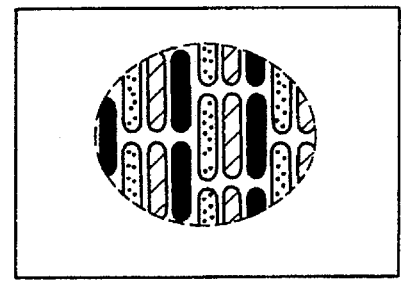

CONVERGENCE MEASURING APPARATUS

This is a continuation of application Ser. No. 07/936,808, filed Aug. 27, 1992, now abandoned.

BACKGROUND OF THE INVENTION

1. Field of the Invention

The present invention relates to a convergence measuring apparatus for measuring a color misconvergence amount on a screen of a color cathode-ray tube.

2. Description of the Prior Art

A convergence measuring apparatus is known in which a color misconvergence amount on a screen of a color cathode-ray tube in a color television receiver or color display device is automatically measured.

In a convergence measuring apparatus of this type, a dot or cross-hatched pattern is displayed on the screen of a color cathode-ray tube, and an image of the dot pattern or the like is picked up by an image pickup camera. The picked image is converted from analog data into digital data, which is stored in a memory. The digital data is then subjected to image processing, so that the centers of gravity of luminance distribution areas of red (R), green (G), and blue (B) pattern data are calculated. Shift amounts of the centers of the gravity of the respective color components are obtained to measure the degree of convergence.

For example, when a dot pattern is displayed on the screen of the color cathode-ray tube, the centers of gravity of the luminance distributions of the pattern are shifted from each other depending on dot pattern display positions. For example, when a red (R) dot pattern is displayed on the screen of the cathode-ray tube, a red (R) phosphor portion of the screen of the color cathode-ray tube emits light, while the green (G) and blue (B) phosphor portions do not emit light. For this reason, the luminance distribution of the dot pattern tends to be discontinuous. As shown in FIGS. 1a and 1c, the center of the dot pattern is located at the central position of symmetrical right and left red (R) phosphors, a center A of the gravity of the inherent luminance distribution coincides with a center B of the luminance distribution of the dot pattern, and no problem is posed. However, when a dot pattern display position is slightly shifted, as shown in FIG. 1b or 1c, the following problem is posed. That is, when a center B of the luminance distribution of the dot pattern is shifted as shown in FIG. 1b with respect to a center A of gravity of the inherent luminance distribution in, e.g., a 0.8 mm pitch stripe tube, the position is shifted by 0.075 mm in the negative direction (i.e., the left direction in FIG. 1b). Similarly, when the center B of the gravity of the luminance distribution of the dot pattern is shifted as shown in FIG. 1d with respect to the center A of the inherent luminance distribution, the center is shifted by 0.075 mm in the positive direction (i.e., the right direction in FIG. 1d). In this manner, the center of gravity of the luminance distribution of the dot pattern is shifted to a maximum of ±0.075 mm depending on the display position on the color cathode-ray tube. The same problem is posed in green (G) and blue (B) dot patterns. It is therefore difficult to obtain the accurate centers of gravity of the luminance distributions of the dot patterns. A convergence error occurs in a maximum range of ±0.15 mm, and convergence measurement cannot be accurately performed.

In order to solve the above problem, a specific convergence measurement tube such as a tube having no shadow mask or a monochrome tube may be used. In this case, the resultant apparatus results in a special-purpose apparatus which can measure convergence for specific models and loses versatility.

SUMMARY OF THE INVENTION

The present invention has been made to solve the conventional problems described above, and has as its object to provide a convergence measuring apparatus capable of accurately performing convergence measurement of a color cathode-ray tube without using a specific tube such as a monochrome tube or a tube having no shadow mask.

In order to achieve the above object according to the present invention, there is provided a convergence measuring apparatus comprising beam moving means for moving a beam spot of a dot pattern displayed on a screen of a color cathode-ray tube by a predetermined amount in a predetermined direction of horizontal and vertical directions, an image pickup camera for picking up a beam pattern at each position of the beam spot moved by the beam moving means, a memory for storing an image of the dot pattern at each position of the beam spot picked up by the image pickup camera, image synthesizing means for synthesizing dot pattern data stored in the memory after images of the dot pattern data are returned by movement amounts, and a convergence arithmetic unit for calculating a convergence amount from a shift amount of a center of a luminance distribution of each synthesized dot pattern data.

According to the arrangement of the present invention, for example, a red (R) beam dot pattern is displayed on the screen of the color cathode-ray tube. This dot pattern is a pattern in which its luminance distribution becomes discontinuous because only the red (R) phosphor portion emits light. The resultant pattern is picked up by the image pickup camera, and the picked image of the dot pattern is stored in the memory.

If a gap between the adjacent red (R) phosphor elements of the screen of the color cathode-ray tube is defined as one pitch, the dot pattern is moved by, e.g., a ⅓ pitch by the beam moving means in the horizontal direction. The resultant dot pattern is picked up by the image pickup camera, and is stored in the memory. In the dot pattern moved by the ⅓ pitch, the red (R) phosphor position is shifted by the ⅓ pitch, so that the emission position is shifted by the ⅓ pitch in the horizontal direction accordingly.

Similarly, the dot pattern is further moved by another ⅓ pitch (a total of ⅔ pitch with respect to the initial pattern) by the beam moving means in the horizontal direction, and the moved dot pattern is stored in the memory.

The dot pattern data having the respective movement positions and stored in the memory are returned by the corresponding shift amounts and are superposed and synthesized by the image synthesizing means. Processing such as interpolation is performed to compensate for discontinuous portions of the respective luminance distributions, thereby obtaining pattern data in which all dot patterns emit light. A center $G_R$ of gravity of the luminance distribution is obtained by this synthesized pattern data.

Similarly, a center $G_G$ of gravity of the luminance distribution of a green (G) dot pattern is obtained from the synthesized pattern data, and a center $G_B$ of gravity of the luminance distribution of the blue (B) dot pattern is obtained from the synthesized pattern data. For example, in the convergence arithmetic unit, misconvergence amounts of red (R) and green (G) are obtained from the shift amounts of the centers $G_R$ and $G_G$ of gravity and misconvergence amounts of green (G) and blue (B) are obtained from the shift amounts of the centers $G_G$ and $G_B$ of gravity with reference to the center of emission of the green (G) dot pattern data.

BRIEF DESCRIPTION OF THE DRAWINGS

FIGS. 3a and 3b are views for explaining detection of a control voltage required for beam spot movement of one pitch; and FIGS. 4a to 4d and FIGS. 4a' to 4c' are views for explaining image processing of showing the relationship among movement patterns of beam spots, their picked and stored pattern data, and their synthesized pattern data.

DETAILED DESCRIPTION OF THE PREFERRED EMBODIMENT

An embodiment according to the present invention will be described with reference to the accompanying drawings.

Figure 1A:
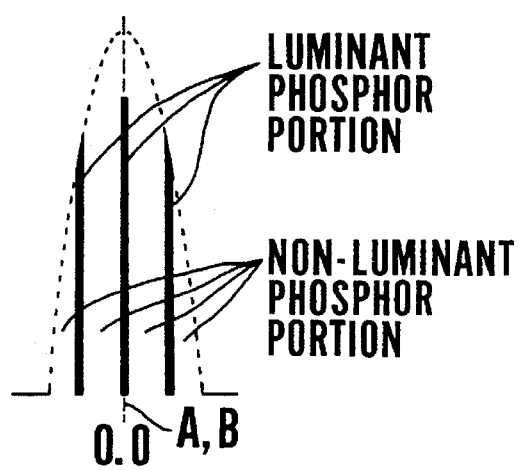
FIGS. 1a, 1b, 1c, and 1d are views for explaining phenomena in which centers of gravity of luminance distributions are shifted depending on dot pattern display positions when, e.g., red (R) dot patterns are displayed on a cathode-ray tube.
Figure 1C:
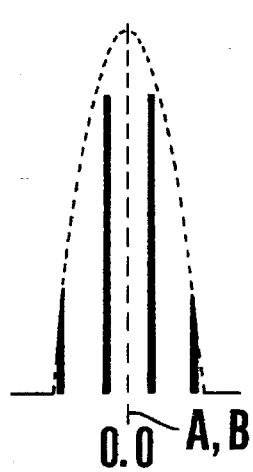
Figure 1B:
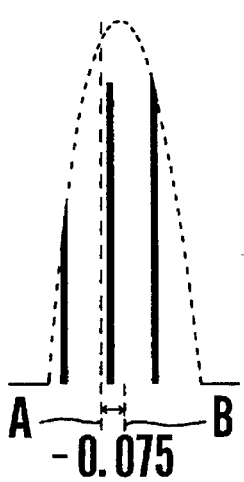
Figure 1D:
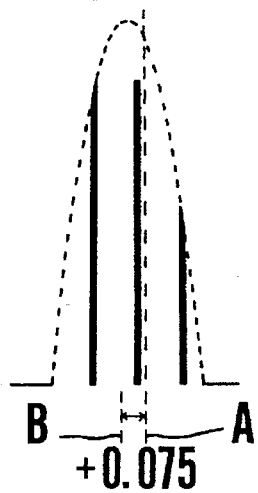
Figure 2:
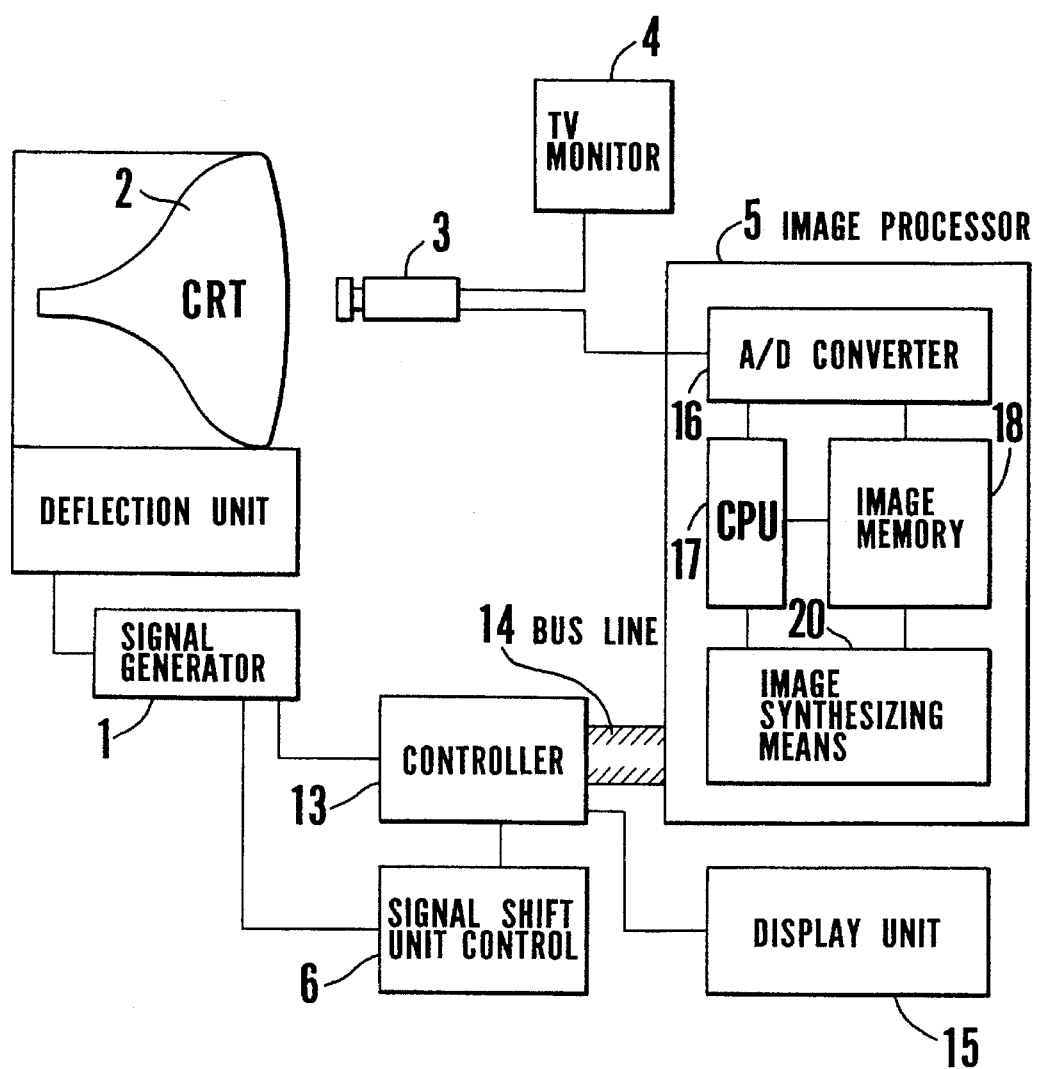
FIG. 2 is a block diagram showing a convergence measuring apparatus according to an embodiment of the present invention.

FIG. 2 is a block diagram of a convergence measuring apparatus according to an embodiment of the present invention. Referring to FIG. 2, a signal generator 1 incorporates a video signal delay circuit, changes a delay amount in accordance with a voltage applied from a signal movement amount control unit 6, generates a dot pattern in a vertical or horizontal position corresponding to the delay amount, and applies the dot pattern to a color cathode-ray tube 2. The color cathode-ray tube 2 is driven by a driver (not shown) and displays designated red (R), green (G), and blue (B) dot patterns on the screen.

The signal movement amount control unit 6 receives a command from a controller 13 and applies a control signal for controlling a dot pattern generation position (a video signal delay amount) to the signal generator 1. An image pickup camera 3 opposes the color cathode-ray tube 2 and picks up a dot pattern displayed on the screen of the cathode-ray tube 2. The picked image is supplied to a television monitor 4 and an image processor 5. The television monitor 4 displays the image picked up by the image pickup camera 3 on the monitor screen, so that the pattern on the screen of the color cathode-ray tube 2 can be displayed in real time.

The controller 13 controls operation timings of the signal generator 1 and the signal movement amount control unit 6, exchanges signals with the image processor 5 through a bus line 14, and controls the operations of a display unit 15.

The image processor 5 comprises an A/D converter 16, an arithmetic unit (CPU) 17 serving as a convergence arithmetic unit, an image memory 18, and an image synthesizing means 20.

The A/D converter 16 converts analog luminance data of a dot pattern image supplied from the image pickup camera 3 into digital data. The digital data is stored in the image memory 18. The image memory 18 therefore stores image data of all dot patterns picked up by the image pickup camera 3. The image synthesizing means 20 synthesizes image data of the respective dot patterns stored in the image memory 18. The CPU 17 calculates shift amounts of the centers of gravity of luminance distributions of red (R), green (G), and blue (B) dot pattern data each of which is synthesized by the image synthesizing means 20, thereby obtaining a convergence amount. This calculation result is displayed on the display unit 15.

A convergence measurement operation of this embodiment will be described below. For example, as shown in FIG. 4a, a red (R) beam dot pattern is displayed on the screen of the color cathode-ray tube 2. In the dot pattern displayed on the screen, only the red (R) phosphor portion emits light, while green (G) and blue (B) phosphor portions do not emit light. The green (G) and blue (B) phosphor luminance portions are omitted from the resultant dot pattern. This dot pattern is converted into digital data by the A/D converter 16 and is stored as pattern data shown in FIG. 4a' at a predetermined position of the image memory 18.

A delay control voltage for moving a dot pattern is applied from the signal movement amount control unit 6 to the signal generator 1 to move the beam spot of this dot pattern by a ⅓ pitch to the left in the horizontal direction. In this embodiment, a gap between the adjacent red (R) phosphor elements is defined as one pitch. As shown in FIG. 3a, initial pickup luminance data by the red (R) phosphor portions is stored in the memory. The dot pattern is then moved. When luminance data (FIG. 3b) having the same level as that of the pickup luminance data stored in the memory is obtained, it is determined that the beam spot is moved by one pitch. The voltage (delay amount of the video signal) required for one-pitch movement from the signal movement amount control unit 6 is obtained, and ⅓ of the obtained voltage is applied to the signal generator 1, so that the beam spot is moved by the ⅓ pitch to the right in the horizontal direction, thereby obtaining a beam spot of a dot pattern shown in FIG. 4b.

In the dot pattern shown in FIG. 4b, a pattern portion shifted by the ⅓ pitch with respect to the pattern shown in FIG. 4a serves as the red (R) phosphor portion which emits light. The luminances of the remaining green (G) and blue (B) phosphor portions are omitted from the pattern in FIG. 4b. The dot pattern shown in FIG. 4b is also converted into digital data by the A/D converter 16 and is stored as pattern data (FIG. 4b) at a predetermined position in the image memory 18.

A voltage corresponding to a ⅔-pitch movement amount is applied from the signal movement amount control unit 6 to the signal generator 1 to move the pattern of FIG. 4a to the right in the horizontal direction by the ⅔ pitch, thereby obtaining a dot pattern shown in FIG. 4c. The pattern shown in FIG. 4c is a pattern obtained by further moving the pattern of FIG. 4b to the right by another ⅓ pitch in the horizontal direction. In this case, a portion shifted by the ⅓ pitch with respect to the pattern shown in FIG. 4b, i.e., by the ⅔ pitch with respect to the pattern of FIG. 4a emits light as the red (R) phosphor position, and the remaining portion does not emit light, so that the luminances of the green (G) and blue (B) phosphor portions are omitted from the pattern of FIG. 4c. Similarly, the pattern in FIG. 4c is converted into digital data and stored as pattern data (FIG. 4c') in the image memory 18. Circles indicated by broken lines in FIGS. 4a', 4b', and 4c' are imaginary lines for the edges of the dot patterns.

The dot pattern data (FIGS. 4a', 4b', and 4c') stored in the image memory 18 are synthesized by the image synthesizing means 20. In this synthesis, the dot pattern data shown in FIG. 4b' is returned to the left by the ⅓ pitch and overlaps the dot pattern data shown in FIG. 4a'. In addition, the dot pattern data shown in FIG. 4c' is returned to the left by the movement amount, i.e., the ⅔ pitch and overlaps the dot pattern shown in FIG. 4a'. As a result, synthesized dot pattern data shown in FIG. 4d is obtained. In the synthesized dot pattern data shown in FIG. 4d, the omitted portions of the luminances of the data in FIGS. 4a, 4b, and 4c are compensated for each other. Therefore, this synthesized data becomes pattern data (i.e., dot pattern data having almost no discontinuous luminance portion) representing almost all the dot patterns which emit light. The synthesized dot pattern data shown in FIG. 4d is stored in the image memory 18.

Similarly, a green (G) dot pattern is displayed on the screen of the color cathode-ray tube 2 and the luminance data of this dot pattern is stored in the image memory 18. At the same time, a dot pattern obtained by shifting the above dot pattern by the ⅓ pitch is picked up, and synthesized dot pattern thereof is obtained and stored in the image memory 18. In addition, a blue (B) beam dot pattern is also picked up, and synthesized dot pattern data thereof is stored in the image memory 18.

The CPU 17 calculates positions of the centers of gravity of the luminance distributions of the synthesized red (R), green (G), and blue (B) dot pattern data and calculates, for example, a red (R) convergence amount with respect to green (G) in accordance with shift amounts of the red (R) center $G_R$ of gravity and the green (G) center $G_G$ of gravity with reference to the green (G) center $G_G$ of gravity. The CPU 17 calculates a blue (B) convergence amount with respect to the green (G) in accordance with the shift amounts of the center $G_G$ of gravity of the synthesized green(G) dot pattern data and the center $G_B$ of gravity of the synthesized blue (B) dot pattern data. In addition, a three-dimensional histogram or luminance contour diagram of the luminance distributions is obtained, as needed. The calculation results are stored in the image memory 18 and at the same time displayed on the display unit 15.

In the above description, the beam is moved in the horizontal direction. However, the beam spot of each dot pattern may be vertically moved. Synthesized dot pattern data free from luminance omissions can be obtained by moving the beam spots in the vertical negative position in units of predetermined pitches, and convergence measurement can be performed on the basis of the synthesized dot pattern data.

The present invention is not limited to the particular embodiment described above. Various changes and modifications may be made. In the above embodiment, a video delay signal (video delay control voltage) is applied from the signal movement amount control unit 6 to the signal generator 1 to move the beam spot of each dot pattern. However, a technique for moving the beam spot is not limited to this. For example, a color cathode-ray tube as a target object may be stored in a Helmholtz chamber, a current flowing in this chamber may be automatically detected, and the current may be controlled in accordance with the movement amount of the beam spot. In addition, a delay circuit may be added to a deflection circuit of the color cathode-ray tube, and a current flowing in the deflection circuit may be controlled and delayed to obtain a dot pattern shifted by a predetermined number of pitches. Other various means may be equally employed.

In the above embodiment, each dot pattern is shifted every ⅓ pitch and the resultant dot pattern is picked up. However, each dot pattern may be shifted every ⅙ pitch, and a dot pattern at each movement position can be picked up. In general, a non-emission portion is present between the adjacent red (R), green (G), and blue (B) phosphor portions. Strictly speaking, even if three dot patterns shifted by ⅓ pitches are synthesized, the luminance omission portions which emit a very small amount of light are formed. In this case, synthesized pattern data may be corrected to obtain a perfect spot shape. However, when the movement pitch of the beam spot is reduced like the ⅙ pitch, a perfect beam spot free from the non-emission luminance omission portions can be synthesized, thereby further improving the precision of the convergence measurement. In addition, three images consisting of the originally picked image, an image obtained by shifting this dot pattern by ⅓ pitch in the right direction, and an image obtained by shifting this dot pattern by ⅓ in the left direction may be synthesized to obtain the same effect.

In the above embodiment, the red (R), green (G), and blue (B) dot patterns are independently picked up. However, the red (R), green (G), and blue (B) dot patterns may be simultaneously picked up, and the picked data may be color-separated by image processing. Thereafter, pattern data shifted by predetermined pitches may be obtained, and synthesized dot pattern data in units of color components may be obtained from the dot pattern data of the respective color components, thereby calculating a convergence amount.

A beam shape of a dot tube can be obtained as an application of this embodiment.

According to the present invention, each dot pattern is moved every predetermined amount, and patterns at the respective movement positions are picked up and stored in a memory. The dot pattern data at the respective movement position are returned by the corresponding movement amounts, and each synthesized pattern data is obtained by the above pattern data. An almost perfect dot pattern data almost free from omission portions as luminance discontinuous portions can be obtained in units of color components, i.e., red (R), green (G), and blue (B) even in the color cathode ray tube. A convergence amount can be calculated by the synthesized pattern data. Therefore, high-precision, accurate convergence measurement of the color cathode-ray tube can be performed without using a special convergence measurement tube such as a monochrome tube or a tube having no shadow mask.

Since the monochrome tube or the special tube for measuring the convergence need not be prepared, the apparatus arrangement can be simplified.

What is claimed is:

1. A convergence measuring apparatus in a color cathode ray tube for displaying three color dot patterns on a screen thereof comprising:

beam moving means for moving a beam spot of a dot pattern displayed on said screen by a predetermined amount in a predetermined horizontal or vertical direction;

an image pickup camera for picking up said dot pattern at each position of said beam spot moved by said beam moving means;

a memory for storing image data of said dot pattern of each beam spot picked up by said image pickup camera;

image synthesizing means for synthesizing respective dot patterns based on said dot patterns stored in said memory; and, a convergence arithmetic unit for calculating each position of center of gravity of luminance distribution of each of said synthesized dot patterns with reference to said color dot patterns and obtaining misconvergence amounts from a shift amount between one and other centers of gravity.

2. A convergence measuring apparatus according to claim 1, wherein the movement amount of the beam spot by said beam moving means is a ⅓ pitch where a pitch is the distance between successive horizontal or vertical repeat patterns of color on said screen.

3. A convergence measuring apparatus according to claim 1, wherein the movement amount of the beam spot by said beam moving means is a ⅙ pitch.

4. A convergence measuring apparatus in a color cathode ray tube for displaying three color dot patterns on a screen thereof comprising:

a signal generator for generating designated color dot patterns on said screen and for moving a beam spot of a dot pattern displayed on said screen in a predetermined horizontal or vertical direction;

signal movement amount control unit for applying a delay control signal to move said dot pattern to said signal generator;

an image pickup camera arranged opposite to the tube for picking up the dot pattern at each position of said beam spot moved by said signal generator;

a memory for storing image data of said dot pattern at each position of said beam spot picked up by said image pickup camera;

image synthesizing means for synthesizing respective dot patterns based on said dot patterns stored in said memory; and a convergence arithmetic unit for calculating each position of center of gravity of luminance distribution of each of said synthesized dot patterns with reference to said color dot patterns and obtaining misconvergence amounts from a shift amount between one and other centers of gravity.

5. A convergence measuring apparatus according to claim 4, wherein the movement amount of the beam spot by said beam moving means is a ⅓ pitch.

6. A convergence measuring apparatus according to claim 4, wherein the movement amount of the beam spot by said beam moving means is a ⅙ pitch.

* * * * *